United States Patent
Sato

(10) Patent No.: US 6,900,948 B2
(45) Date of Patent: May 31, 2005

(54) SINGLE FOCUS LENS

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 392 days.

(21) Appl. No.: 10/233,501

(22) Filed: Sep. 4, 2002

(65) Prior Publication Data

US 2003/0112530 A1 Jun. 19, 2003

(30) Foreign Application Priority Data

Sep. 26, 2001 (JP) ........................................ 2001-293223

(51) Int. Cl.[7] .............................. G02B 13/18; G02B 9/34
(52) U.S. Cl. ...................... 359/715; 359/772; 359/773; 359/774; 359/780
(58) Field of Search ................................. 359/715, 772, 359/773, 774, 780

(56) References Cited

U.S. PATENT DOCUMENTS 5,808,815 A    9/1998  Kouthoofd
5,986,816 A  * 11/1999  Shikama ...................... 359/644
6,636,364 B2 * 10/2003  Sato ........................... 359/713

* cited by examiner

Primary Examiner—Scott J. Sugarman
(74) Attorney, Agent, or Firm—Arnold International; Bruce Y. Arnold

(57) ABSTRACT

A single focus lens is disclosed that is formed of only four lens elements. In order from the object side, these are: a first lens element of positive refractive power and having either a concave surface or planar surface on the object side; a second lens element of weak refractive power and meniscus shape that is made of plastic with at least one surface aspheric; a third lens element which has positive refractive power and a convex surface on the image side; and a fourth lens element of weak refractive power and meniscus shape that is made of plastic with at least one surface aspheric and with its concave surface on the image side. Preferably, various conditions are satisfied in order that the single focus lens be compact and favorably correct aberrations so as to provide a high quality image.

16 Claims, 3 Drawing Sheets

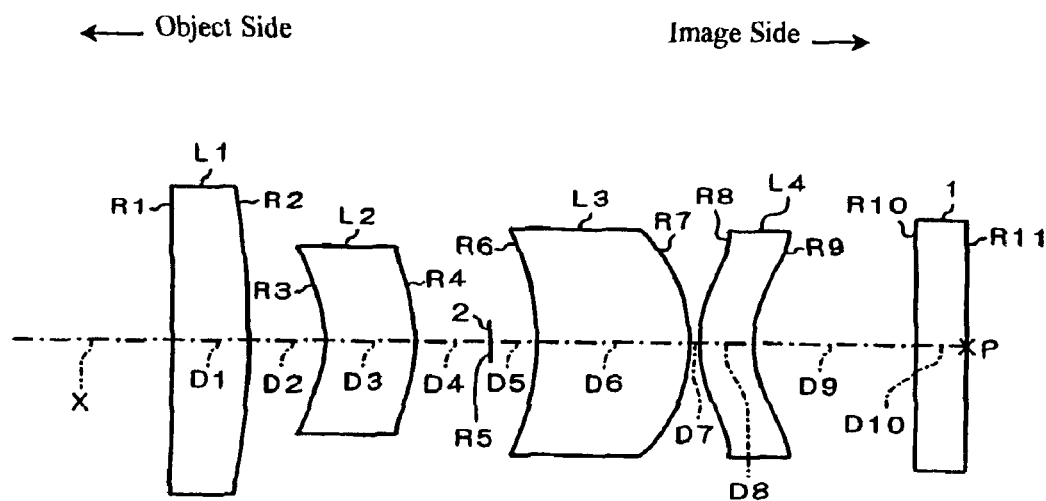
Fig. 3
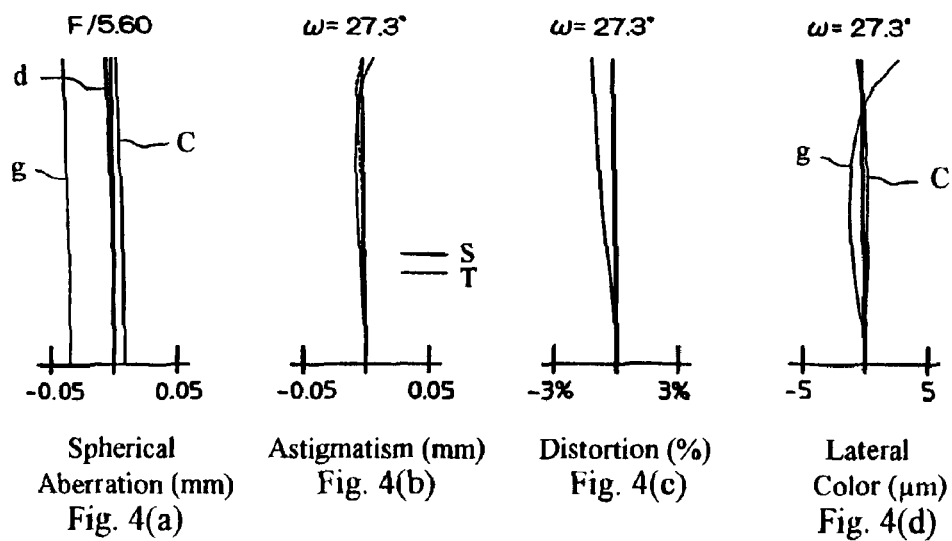
Spherical Aberration (mm)
Fig. 4(a)
Astigmatism (mm)
Fig. 4(b)
Distortion (%)
Fig. 4(c)
Lateral Color (μm)
Fig. 4(d)

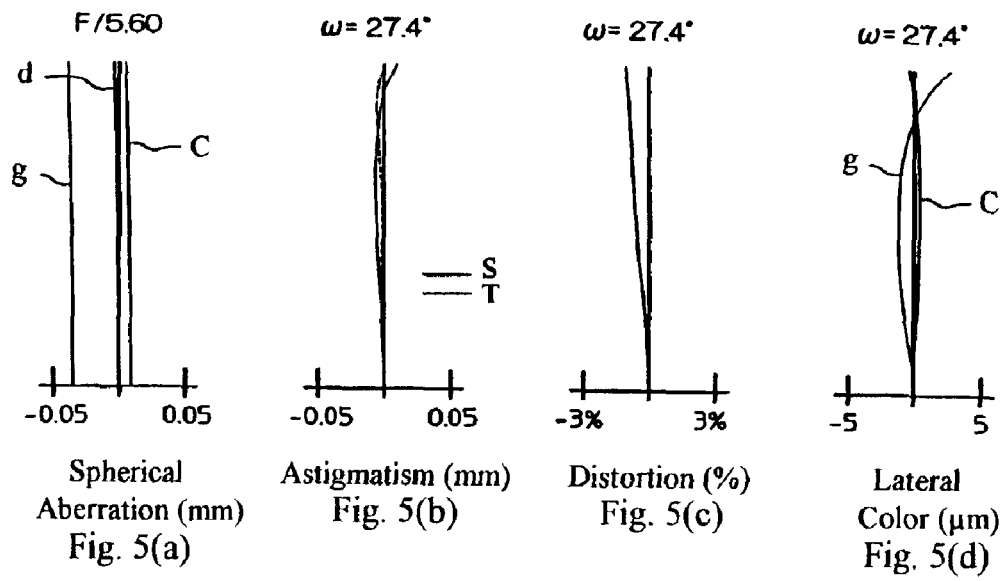
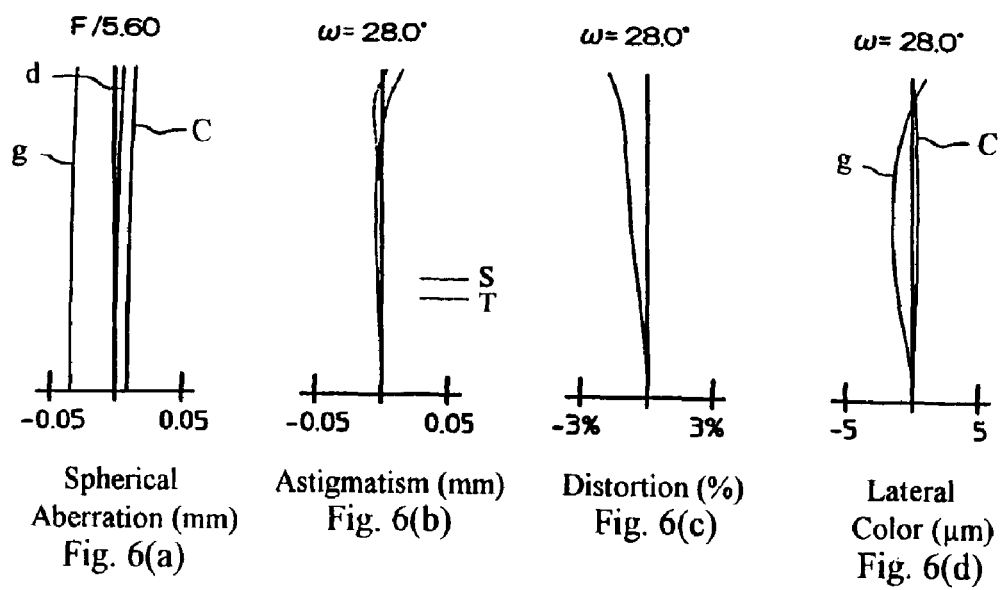

SINGLE FOCUS LENS

BACKGROUND OF THE INVENTION

In recent years personal computers have become very popular. Now, digital cameras that enable photographed picture information to be easily processed are rapidly becoming popular.

More compact and inexpensive digital cameras are being demanded; therefore, it is especially urgent to provide a more compact and inexpensive photographic lens for such cameras. To respond to these requirements, the inventor of the present application has developed a single focus lens that is formed of only three lens elements, as disclosed in Japanese Patent Application 2001-156653. This single focus lens is formed of, in order from the object side, a first lens element having at least one surface aspheric and which has a weak refractive power, a second lens element of positive refractive power and having its image side surface convex, and a third lens element having at least one surface aspheric and which has a weak refractive power. Although the above-mentioned prior art can meet the requirement of being compact and inexpensive, additional improvements are required from the standpoint of aberration correction in order to provide a higher-quality model of single focus lens. Furthermore, as compared with a conventional compact camera that uses film, the design of a lens for a digital camera is much different not only because of the electronic image sensor that receives the image in a digital camera being much smaller, but also because it is necessary in digital cameras to have the light rays be incident onto the image sensor roughly perpendicular to the detecting surface of the image sensor. Further, a high aperture efficacy and a long back focus are required in digital cameras.

BRIEF SUMMARY OF THE INVENTION

The object of the present invention is to provide a single focus lens which has excellent correction of aberrations, is compact, and yet is low in cost as a result of their being only four lens elements used in the single focus lens. The single focus lens of the present invention is for use as a photographic lens of a compact camera, especially a compact digital camera.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 3 shows the basic lens element configuration of a single focus lens according to Embodiment 3 of the present invention;

FIGS. 4(a)–4(d) show the spherical aberration, astigmatism, distortion, and lateral color, respectively, of the single focus lens of Embodiment 1;

FIGS. 5(a)–5(d) show the spherical aberration, astigmatism, distortion, and lateral color, respectively, of the single focus lens of Embodiment 2; and FIGS. 6(a)–6(d) show the spherical aberration, astigmatism, distortion, and lateral color, respectively, of the single focus lens of Embodiment 3.

DETAILED DESCRIPTION

Figure 1:
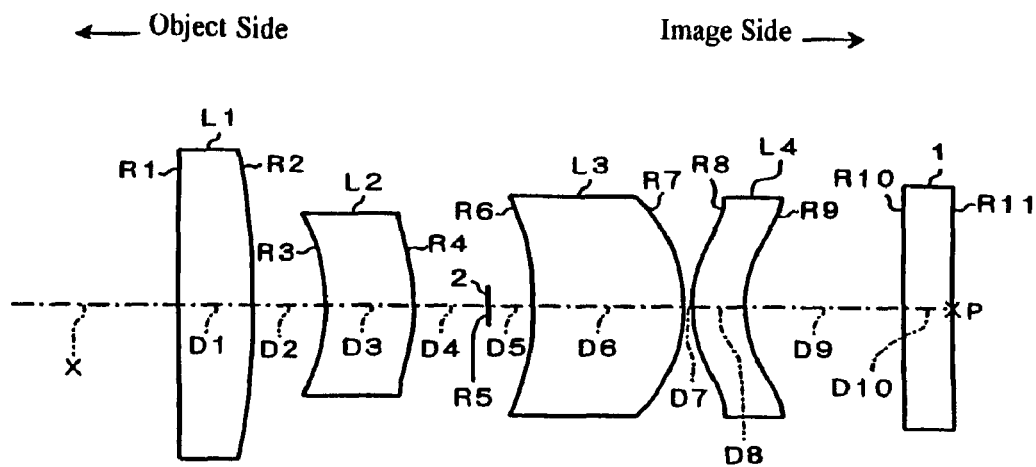
FIG. 1 shows the basic lens element configuration of a single focus lens according to Embodiment 1 of the present invention.

The present invention relates to a compact single focus lens, and it especially relates to a single focus lens most suitable for use in a digital camera.

The single focus lens of the present invention is formed of, in order from the object side, a first lens element of positive refractive power having either a concave surface or a flat surface on the object side; a second lens element of weak refractive power and a meniscus shape which is formed of plastic and has at least one aspheric surface; a third lens element which has positive refractive power and a convex surface on the image side; and a fourth lens element which has a weak refractive power and a meniscus shape with its concave surface on the image side and is made of plastic where at least one surface is aspheric. The term "weak" refractive power as used above to define the power of the second lens element and the fourth lens element, in order from the object side, is herein defined as a surface having a refractive power the absolute value of which is less than one-third the refractive power of the first lens element and less than one-third the refractive power of the third lens element, respectively, in order from the object side.

In addition, the object side surface of the third lens element is designed to be concave.

Further, the single focus lens of the present invention has a diaphragm stop arranged between the second lens element and the third lens element, in order from the object side.

Preferably, the following Conditions (1)–(3) are satisfied:

| | |
|---|---|
| $-0.2 < f/f_2 < 0.2$ | Condition (1) |
| $-0.2 < f/f_4 < 0.2$ | Condition (2) |
| $f_1/f_3 > 2$ | Condition (3) | where f is the focal length of the single focus lens, $f_1$ is the focal length of the first lens element, in order from the object side, $f_2$ is the focal length of the second lens element, in order from the object side, $f_3$ is the focal length of the third lens element, in order from the object side, and $f_4$ is the focal length of the fourth lens element, in order from the object side.

In addition, the following Conditions (4)–(6) are preferably satisfied:

| | |
|---|---|
| $N_{d1} > 1.70$ | Condition (4) |
| $\nu_{d1} < 35$ | Condition (5) |
| $\nu_{d3} > 50$ | Condition (6) | where $N_{d1}$ is the index of refraction at the d-line of the first lens element, in order from the object side, $\nu_{d1}$ is the Abbe number at the d-line of the first lens element, in order from the object side, and $\nu_{d3}$ is the Abbe number at the d-line of the third lens element, in order from the object side.

Using a plastic, meniscus lens element of weak refractive power for the second lens element and the fourth lens element enables a drastic improvement to be achieved in the correction of aberrations of a single focus lens having only four lens elements.

Further, it is advantageous in terms of the correction of aberrations to design the lens surface that is situated immediately behind the diaphragm stop so as to be concave. However, in the above-mentioned prior art, the lens element that is arranged immediately behind the diaphragm stop has most of the positive refractive power of the single focus lens. Thus, it is difficult to design the object side of this lens element to be concave (i.e., of negative refractive power) and still provide a sufficient positive refractive power for this lens element.

In the single focus lens of the present invention, however, it is possible to disperse the positive refractive power required of the single focus lens primarily among two lens elements, i.e., the first lens element and the third lens element. Thus, if the third lens element is arranged immediately behind the diaphragm stop, it becomes possible to design the surface on the object side of this lens element with a concave shape having a designated curvature while still securing a sufficient positive refractive power in the single focus lens.

The single focus lens of the present invention will first be discussed in general terms, with reference to FIG. 1. Although FIG. 1 is specifically drawn to a single embodiment of the present invention, it also is fairly well representative of the present invention in general.

As shown in FIG. 1, the single focus lens is formed of, in order from the object side: a first lens element L1 of positive refractive power having, in this case, a planar surface on the object side; a second lens element L2 formed of plastic and of weak refractive power having a meniscus shape, with its concave surface on the object side, and at least one aspheric surface; a diaphragm stop 2; a third lens element L3 of positive refractive power having, in this case, a meniscus shape with its convex surface on the image side; and a fourth lens element L4 which has a weak refractive power and a meniscus shape with its concave surface on the image side and is made of plastic with at least one surface being aspheric. Using a plastic, meniscus lens element of weak refractive power for the second lens element and the fourth lens element enables a drastic improvement to be achieved in the correction of aberrations of a single focus lens having only four lens elements. Collimated light that is parallel to the optical axis X is imaged by the single focus lens onto an image sensor through a cover glass 1 to an image point P which defines the center of an image field at the back surface of the cover glass 1. The first lens element L1 and the third lens element L3 are primarily for performing an imaging function, and the second lens element L2 and the fourth lens element L4 are primarily for performing correction of aberrations. In other words, luminous flux that enters into the single focus lens is converged by the first lens element L1, and the aberrations that are generated are corrected by the second lens element L2. In addition, luminous flux is also converged by the third lens element L3, and the aberrations that are generated are corrected by the fourth lens element L4. Thus, a single focus lens is provided which has its aberrations favorably corrected, is compact, and is inexpensive to construct since it has only four lens elements.

In this instance, the first lens element L1 and the third lens element L3 each have positive refractive power, are made of glass with a large Abbe number, and have a strong curvature on the image side. Further, both sides of the second lens element L2 and the fourth lens element L4 are aspheric surfaces having a surface profile defined by the following Equation A:

$$Z = C h^2/(1+(1-KC^2h^2)^{1/2}) + A_4 h^4 + A_6 h^6 + A_8 h^8 + A_{10} h^{10} \quad \text{Equation (A)}$$

where,

Z is the distance of a point on the aspherical surface as measured from the tangential plane at the lens element surface vertex, $C$ $(=1/R)$ is the reciprocal of the paraxial curvature of the aspherical surface, h is the height (in mm) from the optical axis, K is the eccentricity, and $A_4, A_6, A_8,$ and $A_{10}$ are the coefficient constants of the 4th, 6th, 8th and 10th exponential number terms, respectively, for the aspheric surface.

As mentioned above, the second lens element L2 and the fourth lens element L4 have weak refractive power and function primarily as a correction plate; therefore, few aberrations are generated by these surfaces. In addition, these lens elements are designed to be mutually symmetrical about the diaphragm stop 2. Such a configuration enables efficient correction of various aberrations which are generated by the first lens element L1 and by the third lens element L3. Further, since the second lens element L2 and the fourth lens element L4 have only weak refractive power, the design of the aspheric surfaces can be simple.

Further, the concave surface of the second lens element L2 is on the object side, and is for the purpose of providing excellent aberration correction. It is advantageous in terms of the aberration correction to design the lens surface which is situated immediately behind the diaphragm stop 2 to have a concave surface. The single focus lens of the present invention disperses the positive refractive power needed by the lens among primarily two glass lens elements, namely, the first lens element L1 and the third lens element L3. In this manner, it is possible to design the surface immediately behind the diaphragm stop 2 (i.e., the object-side surface of the third lens element L3) so as to be a concave surface of a designated curvature so as to provide excellent correction of aberrations. Furthermore, both surfaces of the second lens element L2 and the fourth lens element L4 are aspheric surfaces. However, as long as at least one surface of each of the second lens element L2 and the fourth lens element L4 are aspheric, aberrations can be sufficiently well-corrected to provide excellent results.

The purpose of Conditions (1)–(6) will now be discussed. Conditions (1)–(3) regulate the power of each lens element. Conditions (1) and (2) regulate the power of the second lens element L2 and the fourth lens element L4, respectively, relative to that of the single focus lens. If these conditions are not satisfied, the influence of environmental factors, such as temperature or humidity, becomes stronger, which is not preferred. On the other hand, Condition (3) regulates the power of the first lens element relative to that of the third lens element. If Condition (3) is not satisfied, a compact single focus lens can not be achieved. Conditions (4)–(6) regulate characteristics of the glass material for the first lens element L1 and the third lens element L3. If these conditions are not satisfied, the correction of chromatic aberration becomes difficult.

Three specific embodiments will now be discussed in detail.

Embodiment 1

Table 1 below lists the surface number # in order from the object side, the radius of curvature R (in mm) near the optical axis, the on-axis spacing D (in mm) between surfaces, as well as the index of refraction $N_d$ and the Abbe number $\nu_d$ (both at the d-line) of each lens element of the single focus lens according to Embodiment 1. In the middle section of the table are listed the focal length f, the F-number $F_{NO}$, and the angle of view $2\omega$. In the bottom portion of the table are listed the values for Conditions (1)–(6) above. Those surfaces having an asterisk * to the right of the surface number are aspheric having a surface profile defined by Equation (A) above.

TABLE 1

| # | R | D | $N_d$ | $\nu_d$ |
|---|---|---|---|---|
| 1 | ∞ | 0.3086 | 1.84666 | 23.8 |
| 2 | −3.2559 | 0.3039 | | |
| 3* | −0.6308 | 0.3647 | 1.49020 | 57.5 |
| 4* | −0.7521 | 0.3039 | | |
| 5 | ∞ (stop) | 0.1851 | | |
| 6 | −1.1089 | 0.6171 | 1.75500 | 52.3 |
| 7 | −0.6427 | 0.0386 | | |
| 8* | 0.5487 | 0.2160 | 1.49020 | 57.5 |
| 9* | 0.4925 | 0.6500 | | |
| 10 | ∞ | 0.2000 | 1.51680 | 64.2 |
| 11 | ∞ | | | |

| f = | 1.00 |
|---|---|
| $F_{NO}$ = | 5.6 |
| $2\omega$ = | 54.6° |

| Condition (1) value: | $f / f_2$ = | −0.0014 |
|---|---|---|
| Condition (2) value: | $f / f_4$ = | 0.0269 |
| Condition (3) value: | $f_1 / f_3$ = | 2.9810 |
| Condition (4) value: | $N_{d1}$ = | 1.84666 |
| Condition (5) value: | $\nu_{d1}$ = | 23.8 |
| Condition (6) value: | $\nu_{d3}$ = | 52.3 |

Table 2 below lists the constants in Equation (A) above for the surface numbers # indicated in Table 1 as being aspheric.

TABLE 2

| # | K | $A_4$ | $A_6$ | $A_8$ | $A_{10}$ |
|---|---|---|---|---|---|
| 3 | −0.5524 | −6.4254 × 10 | 2.4019 | −3.6405 × 10 | 1.2533 × 10² |
| 4 | −0.5595 | 1.1983 | 2.0452 × 10⁻² | −5.7465 × 10 | 4.3456 × 10² |
| 8 | −0.7474 | −9.8797 × 10 | −1.3241 × 10 | 4.3421 × 10 | −1.2155 × 10² |
| 9 | −0.7306 | 1.8609 | −2.0026 × 10 | 4.7826 × 10 | −6.5347 × 10 |

As is apparent from comparing the values listed in the lower section of Table 1 for Conditions (1)–(6) with the respective condition limit(s), the single focus lens according to Embodiment 1 satisfies each of the Conditions (1)–(6).

Embodiment 2

Figure 2:
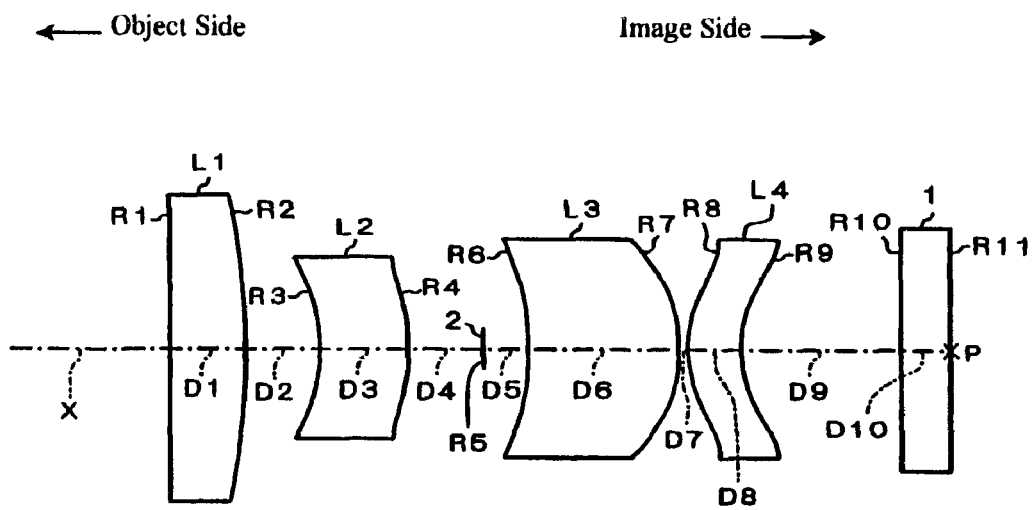
FIG. 2 shows the basic lens element configuration of a single focus lens according to Embodiment 2 of the present invention.

As shown in FIG. 2, the single focus lens of Embodiment 2 is constructed roughly similar to that of Embodiment 1; however, rather than the object side surface of the first lens element being planar, in this embodiment it is very slightly concave.

Table 3 below lists the surface number # in order from the object side, the radius of curvature R (in mm) near the optical axis, the on-axis spacing D (in mm) between surfaces, as well as the index of refraction $N_d$ and the Abbe number $\nu_d$ (both at the d-line) of each lens element of the single focus lens according to Embodiment 2. In the middle section of the table are listed the focal length f, the F-number $F_{NO}$, and the angle of view $2\omega$. In the bottom portion of the table are listed the values for Conditions (1)–(6) above. Those surfaces having an asterisk * to the right of the surface number are aspheric having a surface profile defined by Equation (A) above.

TABLE 3

| # | R | D | $N_d$ | $\nu_d$ |
|---|---|---|---|---|
| 1 | −198.3890 | 0.3106 | 1.84666 | 23.8 |
| 2 | −3.2771 | 0.3058 | | |
| 3* | −0.6221 | 0.3667 | 1.49020 | 57.5 |
| 4* | −0.7389 | 0.3059 | | |
| 5 | ∞ (stop) | 0.1863 | | |
| 6 | −1.1161 | 0.6211 | 1.75500 | 52.3 |
| 7 | −0.6469 | 0.0388 | | |
| 8* | 0.5523 | 0.2174 | 1.49020 | 57.5 |
| 9* | 0.4957 | 0.6500 | | |
| 10 | ∞ | 0.2000 | 1.51680 | 64.2 |
| 11 | ∞ | | | |

| f = | 1.00 |
|---|---|
| $F_{NO}$ = | 5.6 |
| $2\omega$ = | 54.8° |

| Condition (1) value: | $f / f_2$ = | 0.0041 |
|---|---|---|
| Condition (2) value: | $f / f_4$ = | 0.0267 |
| Condition (3) value: | $f_1 / f_3$ = | 3.0285 |
| Condition (4) value: | $N_{d1}$ = | 1.84666 |
| Condition (5) value: | $\nu_{d1}$ = | 23.8 |
| Condition (6) value: | $\nu_{d3}$ = | 52.3 |

Table 4 below lists the constants in Equation (A) above for the surface numbers # indicated in Table 3 as being aspheric.

TABLE 4

| # | K | $A_4$ | $A_6$ | $A_8$ | $A_{10}$ |
|---|---|---|---|---|---|
| 3 | −6.0587 | 6.4654 × 10⁻¹ | 2.2807 | −3.5867 × 10 | 1.2434 × 10² |
| 4 | −5.9950 | 1.2078 | 1.9926 × 10⁻¹ | −5.4887 × 10² | 4.1915 × 10² |
| 8 | −7.7004 | 9.7333 × 10⁻¹ | −1.2842 × 10 | 4.1442 × 10 | −1.1475 × 10² |
| 9 | −7.3063 | 1.8249 | −1.9385 × 10 | 4.5694 × 10 | −6.1625 × 10 |

As is apparent from comparing the values listed in the lower section of Table 3 for Conditions (1)–(6) with the respective condition limit(s), the single focus lens according to Embodiment 2 satisfies each of the Conditions (1)–(6).

Embodiment 3

As shown in FIG. 3, the single focus lens relating to Embodiment 3 is constructed roughly similar to that of Embodiment 2.

Table 5 below lists the surface number # in order from the object side, the radius of curvature R (in mm) near the optical axis, the on-axis spacing D (in mm) between surfaces, as well as the index of refraction $N_d$ and the Abbe number $\upsilon_d$ (both at the d-line) of each lens element of the single focus lens according to Embodiment 3. In the middle section of the table are listed the focal length f, the F-number $F_{NO}$, and the angle of view $2\omega$. In the bottom portion of the table are listed the values for Conditions (1)–(6) above. Those surfaces having an asterisk * to the right of the surface number are aspheric having a surface profile defined by Equation (A) above.

TABLE 5

| # | R | D | $N_d$ | $\nu_d$ |
|---|---|---|---|---|
| 1 | −30.3133 | 0.3164 | 1.84666 | 23.8 |
| 2 | −3.3382 | 0.3113 | | |
| 3* | −0.5367 | 0.3718 | 1.49020 | 57.5 |
| 4* | −0.6195 | 0.3123 | | |
| 5 | ∞ (stop) | 0.1898 | | |
| 6 | −1.1370 | 0.6327 | 1.72916 | 54.7 |
| 7 | −0.6590 | 0.0396 | | |
| 8* | 0.5626 | 0.2215 | 1.49020 | 57.5 |
| 9* | 0.5050 | 0.6800 | | |
| 10 | ∞ | 0.2000 | 1.51680 | 64.2 |
| 11 | ∞ | | | |

| | | |
|---|---|---|
| f = | | 1.00 |
| $F_{NO}$ = | | 5.6 |
| $2\omega$ = | | 56.0° |
| Condition (1) value: | $f / f_2$ = | 0.0580 |
| Condition (2) value: | $f / f_4$ = | 0.0263 |
| Condition (3) value: | $f_1 / f_3$ = | 3.1942 |
| Condition (4) value: | $N_{d1}$ = | 1.84666 |
| Condition (5) value: | $\nu_{d1}$ = | 23.8 |
| Condition (6) value: | $\nu_{d3}$ = | 54.7 |

Table 6 below lists the constants in Equation (A) above for the surface numbers # indicated in Table 5 as being aspheric.

TABLE 6

| # | K | $A_4$ | $A_6$ | $A_8$ | $A_{10}$ |
|---|---|---|---|---|---|
| 3 | −1.2180 | $4.1917 \times 10^{-1}$ | 3.2949 | $-5.2974 \times 10$ | $2.0428 \times 10^2$ |
| 4 | −1.0069 | 1.3561 | −4.9426 | $-3.0184 \times 10$ | $4.5901 \times 10^2$ |
| 8 | 0.4974 | $-3.3312 \times 10^{-2}$ | $-1.1781 \times 10$ | $3.8501 \times 10$ | $-1.0537 \times 10^2$ |
| 9 | −0.7306 | 1.7265 | $-1.7674 \times 10$ | $4.0150 \times 10$ | $-5.2184 \times 10$ |

As is apparent from comparing the values listed in the lower section of Table 5 for Conditions (1)–(6) with the respective condition limit(s), the single focus lens according to Embodiment 3 satisfies each of the Conditions (1)–(6).

FIGS. 4(a)–4(d) show the spherical aberration, astigmatism, distortion, and lateral color, respectively, of the single focus lens according to Embodiment 1. In FIG. 4(a), the spherical aberration is shown for the C, d and g lines. In FIG. 4(b), the astigmatism is shown in both the Sagittal (S) and Tangential (T) image planes. In FIG. 4(d), the lateral color is shown for both the C and g lines. Similarly, FIGS. 5(a)–5(d) show these aberrations for Embodiment 2, and FIGS. 6(a)–6(d) show these aberrations for Embodiment 3. As is obvious from these aberration diagrams, each aberration is very favorably corrected for each embodiment.

The invention being thus described, it will be obvious that the same may be varied in many ways. For example, the lens element configuration, the aspheric surface configuration, and the position of the stop as well as which lens elements are on either side of the diaphragm stop, can be appropriately selected. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens that is formed of only four lens elements, said single focus lens comprising, in order from the object side: a first lens element of positive refractive power and having either a concave surface or planar surface on the object side; a second lens element of weak refractive power that is made of plastic with at least one surface aspheric and which has a meniscus shape; a third lens element which has a positive refractive power and a convex surface on the image side; and a fourth lens element of weak refractive power that is made of plastic with at least one surface aspheric and which has a meniscus shape with its concave surface on the image side.

2. The single focus lens according to claim 1, wherein the object-side surface of the third lens element is concave.

3. The single focus lens according to claim 1, wherein a diaphragm stop is arranged between the second lens element and the third lens element.

4. The single focus lens according to claim 2, wherein a diaphragm stop is arranged between the second lens element and the third lens element.

5. The single focus lens according to claim 1, wherein the following Conditions (1), (2) and (3) are satisfied:

$-0.2 < f/f_2 < 0.2$     Condition (1)

$-0.2 < f/f_4 < 0.2$     Condition (2)

$f_1/f_3 > 2$     Condition (3)

where f is the focal length of the single focus lens, $f_1$ is the focal length of the first lens element, in order from the object side, $f_2$ is the focal length of the second lens element, in order from the object side, $f_3$ is the focal length of the third lens element, in order from the object side, and $f_4$ is the focal length of the fourth lens element, in order from the object side.

6. The single focus lens according to claim 2, wherein the following Conditions (1), (2) and (3) are satisfied:

$-0.2<f/f_2<0.2$     Condition (1)

$-0.2<f/f_4<0.2$     Condition (2)

$f_1/f_3>2$     Condition (3)

where f is the focal length of the single focus lens, $f_1$ is the focal length of the first lens element, in order from the object side, $f_2$ is the focal length of the second lens element, in order from the object side, $f_3$ is the focal length of the third lens element, in order from the object side, and $f_4$ is the focal length of the fourth lens element, in order from the object side.

7. The single focus lens according to claim 3, wherein the following Conditions (1), (2) and (3) are satisfied:

$-0.2<f/f_2<0.2$     Condition (1)

$-0.2<f/f_4<0.2$     Condition (2)

$f_1/f_3>2$     Condition (3)

where f is the focal length of the single focus lens, $f_1$ is the focal length of the first lens element, in order from the object side, $f_2$ is the focal length of the second lens element, in order from the object side, $f_3$ is the focal length of the third lens element, in order from the object side, and $f_4$ is the focal length of the fourth lens element, in order from the object side.

8. The single focus lens according to claim 4, wherein the following Conditions (1), (2) and (3) are satisfied:

$-0.2<f/f_2<0.2$     Condition (1)

$-0.2<f/f_4<0.2$     Condition (2)

$f_1/f_3>2$     Condition (3)

where f is the focal length of the single focus lens, $f_1$ is the focal length of the first lens element, in order from the object side, $f_2$ is the focal length of the second lens element, in order from the object side, $f_3$ is the focal length of the third lens element, in order from the object side, and $f_4$ is the focal length of the fourth lens element, in order from the object side.

9. The single focus lens according to claim 1, wherein the following Conditions (4), (5) and (6) are satisfied:

$N_{d1}>1.70$     Condition (4)

$\upsilon_{d1}<35$     Condition (5)

$\upsilon_{d3}>50$     Condition (6)

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

10. The single focus lens according to claim 2, wherein the following Conditions (4), (5) and (6) are satisfied:

$N_{d1}>1.70$     Condition (4)

$\upsilon_{d1}<35$     Condition (5)

$\upsilon_{d3}>50$     Condition (6)

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

11. The single focus lens according to claim 3, wherein the following Conditions (4), (5) and (6) are satisfied:

$N_{d1}>1.70$     Condition (4)

$\upsilon_{d1}<35$     Condition (5)

$\upsilon_{d3}>50$     Condition (6)

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

12. The single focus lens according to claim 4, wherein the following Conditions (4), (5) and (6) are satisfied:

$N_{d1}>1.70$     Condition (4)

$\upsilon_{d1}<35$     Condition (5)

$\upsilon_{d3}>50$     Condition (6)

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

13. The single focus lens according to claim 5, wherein the following Conditions (4), (5) and (6) are satisfied:

$N_{d1}>1.70$     Condition (4)

$\upsilon_{d1}<35$     Condition (5)

$\upsilon_{d3}>50$     Condition (6)

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

14. The single focus lens according to claim 6, wherein the following Conditions (4), (5) and (6) are satisfied:

$$N_{d1} > 1.70 \quad \text{Condition (4)}$$

$$\upsilon_{d1} < 35 \quad \text{Condition (5)}$$

$$\upsilon_{d3} > 50 \quad \text{Condition (6)}$$

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

15. The single focus lens according to claim 7, wherein the following Conditions (4), (5) and (6) are satisfied:

$$N_{d1} > 1.70 \quad \text{Condition (4)}$$

$$\upsilon_{d1} < 35 \quad \text{Condition (5)}$$

$$\upsilon_{d3} > 50 \quad \text{Condition (6)}$$

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

16. The single focus lens according to claim 8, wherein the following Conditions (4), (5) and (6) are satisfied:

$$N_{d1} > 1.70 \quad \text{Condition (4)}$$

$$\upsilon_{d1} < 35 \quad \text{Condition (5)}$$

$$\upsilon_{d3} > 50 \quad \text{Condition (6)}$$

where $N_{d1}$ is the index of refraction at the d-line of the first lens element, in order from the object side, $\upsilon_{d1}$ is the Abbe number at the d-line of the first lens element, in order from the object side, and $\upsilon_{d3}$ is the Abbe number at the d-line of the third lens element, in order from the object side.

* * * * *